Oct. 21, 1941.                L. G. LEVOY, JR                    2,260,039
                            ELECTRIC CONTROL SYSTEM
                    Original Filed Aug. 5, 1938        3 Sheets-Sheet 2
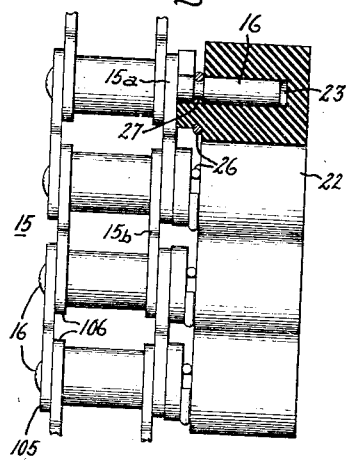
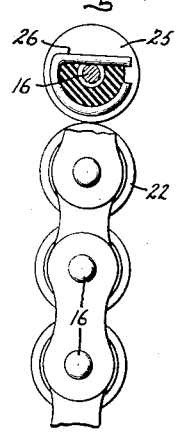
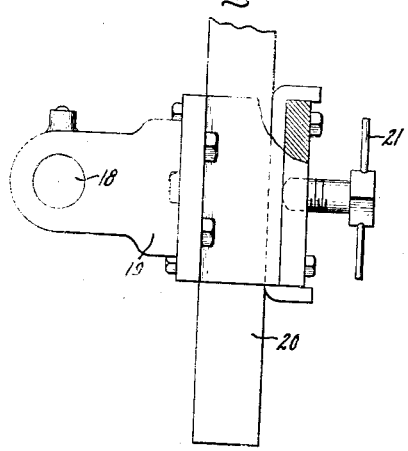
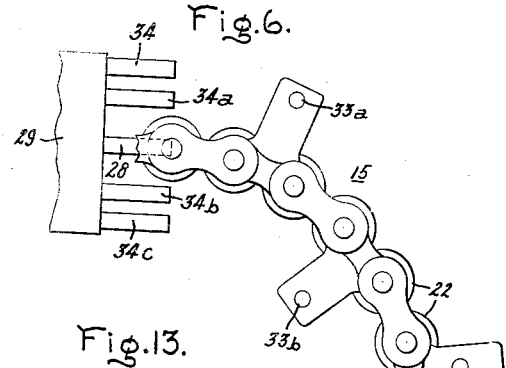
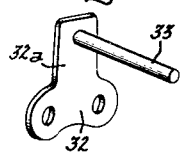
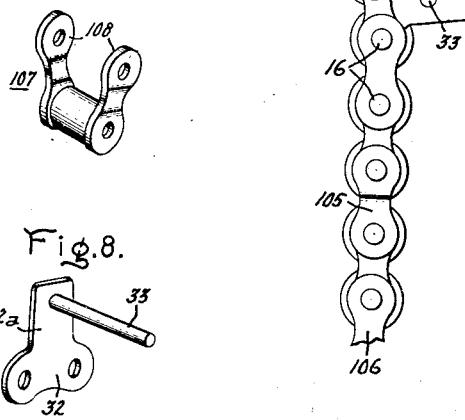
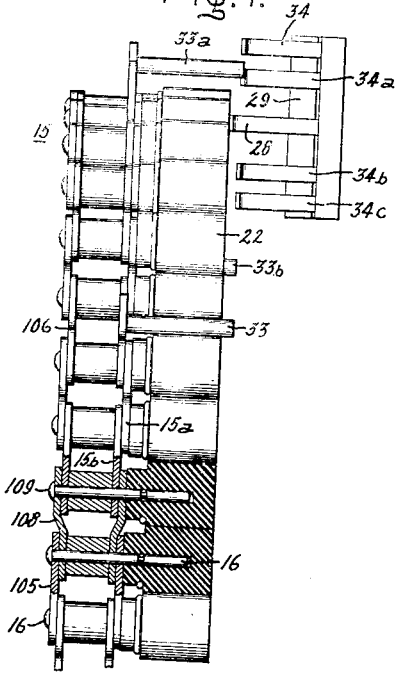
Inventor:
Louis G. Levoy, Jr.
by Harry E. Dunham
His Attorney.

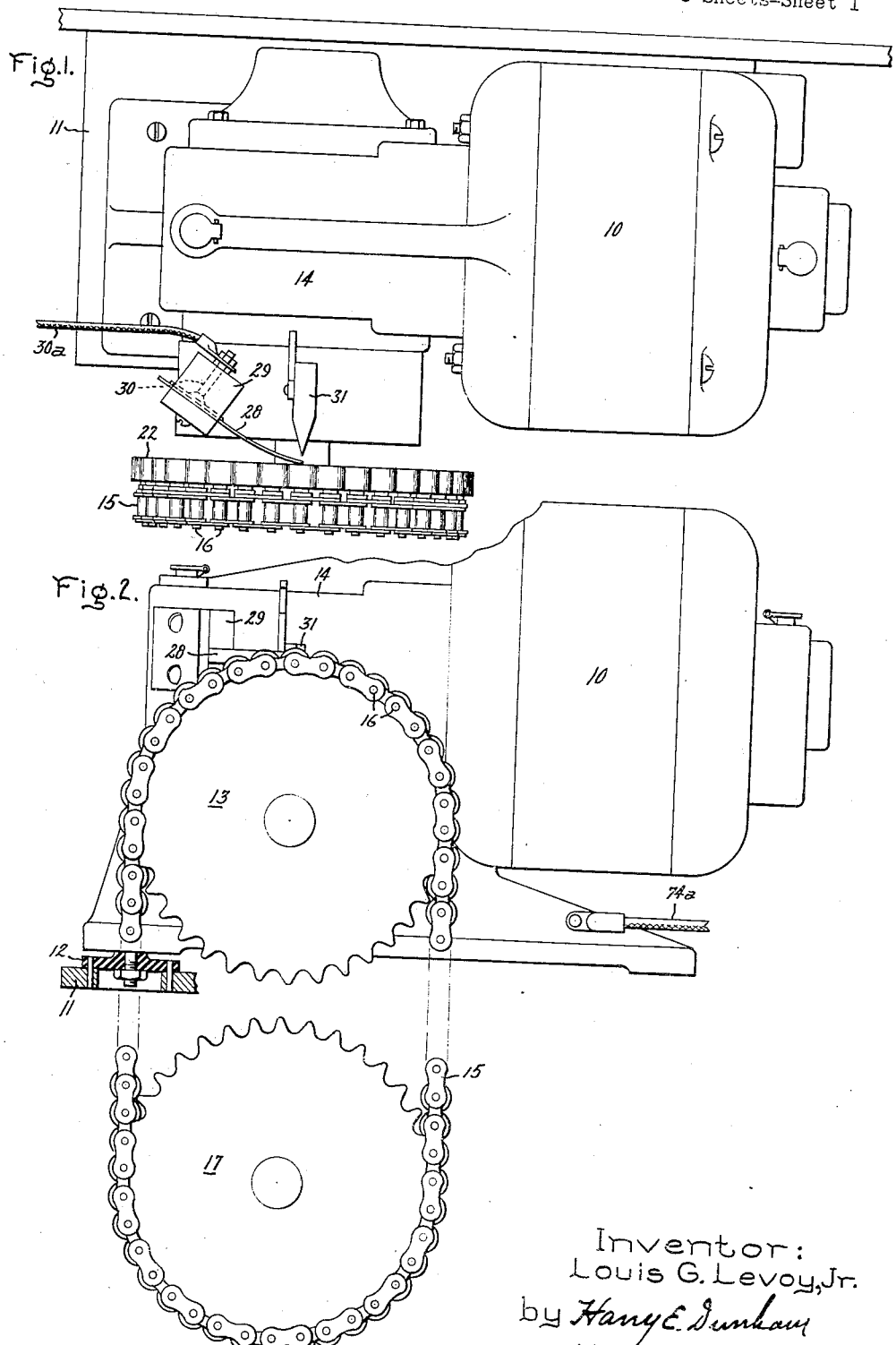

Oct. 21, 1941.  L. G. LEVOY, JR  2,260,039
ELECTRIC CONTROL SYSTEM
Original Filed Aug. 5, 1938   3 Sheets-Sheet 3

Inventor:
Louis G. Levoy, Jr.
by Harry E. Dunham
His Attorney.

Patented Oct. 21, 1941

2,260,039

UNITED STATES PATENT OFFICE 2,260,039

ELECTRIC CONTROL SYSTEM

Louis G. Levoy, Jr., Schenectady, N. Y., assignor to General Electric Company, a corporation of New York Original application August 5, 1938, Serial No. 223,253. Divided and this application February 1, 1940, Serial No. 316,863

9 Claims. (Cl. 250—27)

My invention relates to electric control apparatus and more particularly to control apparatus for electric valve equipment.

Due to the flexibility of control of electric valve apparatus, there has been evidenced a decided need for improved control circuits therefor to effect energization of a load circuit, such as a welding circuit, from an alternating current supply circuit during an accurately determinable interval of time, or to effect periodic energization of a load circuit during accurately determinable recurring intervals. In accordance with the teachings of my invention described hereinafter, I provide a new and improved control system for electric valve apparatus.

This application is a division of my application, Serial No. 223,253, filed August 5, 1938, relating to Timing apparatus.

It is an object of my invention to provide a new and improved electric control system.

It is another object of my invention to provide a new and improved control system for electric valve translating apparatus.

Briefly stated, in the illustrated embodiment of my invention I provide new and improved control apparatus for energizing a load circuit, such as a welding circuit, from an alternating current supply circuit. The conductivity of the electric valve means is controlled by means of mechanical switching apparatus, or contact making and breaking mechanism, which cooperates with a transformer which produces periodic voltages of peaked wave form to render the electric valve means conductive during predetermined intervals of time of predetermined duration. Associated equipment is also provided to absorb transient voltages which may be present due to the making and breaking of the control circuit by means of the mechanical switching apparatus, and this additional equipment is connected in the circuit in a manner to assure suppression of extraneous voltage or current transients which would tend to destroy the precision of control.

Figure 9:
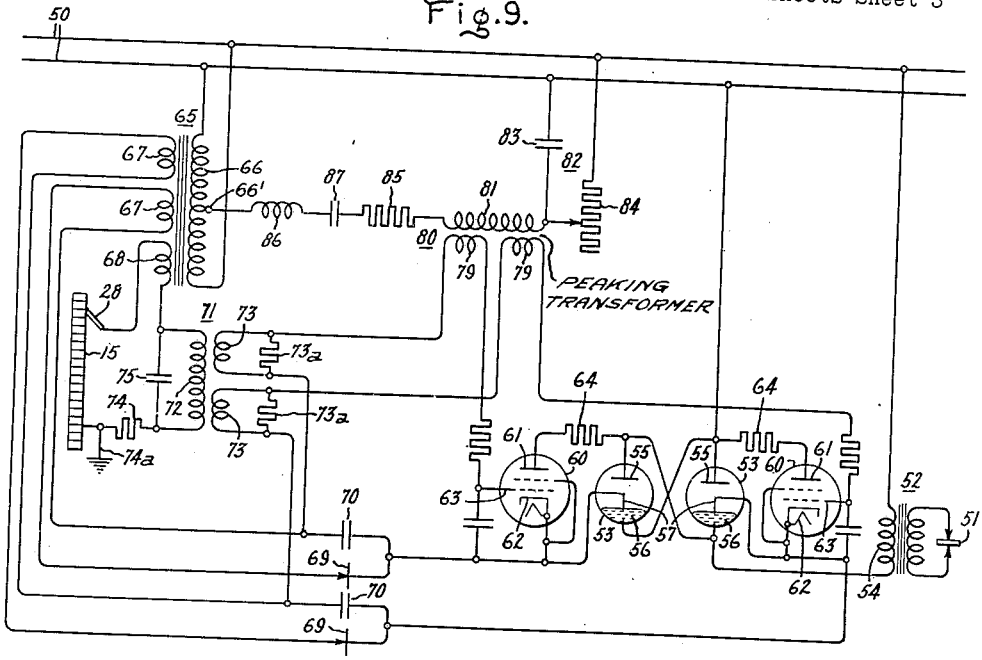
Figure 10:
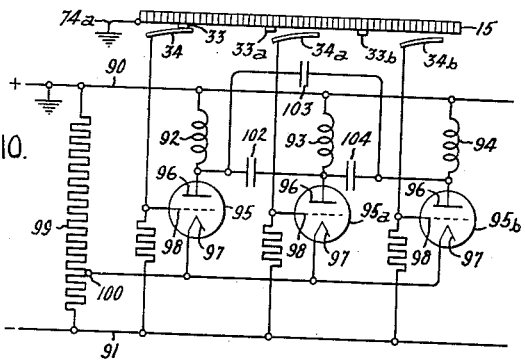
Figure 11:
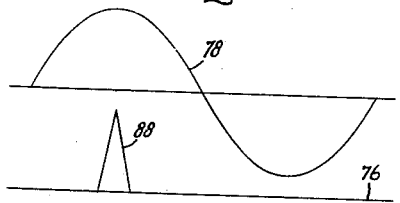
Figure 12:
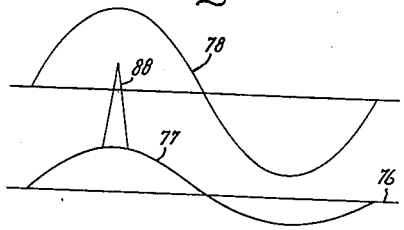

For a better understanding of my invention, reference may be had to the accompanying drawings in which Fig. 1 is a plan view of apparatus embodying my invention; Fig. 2 is a side elevational view, partly broken away, of the apparatus illustrated in Fig. 1; Fig. 3 is an enlarged view, partly in section, of a portion of the chain and commutator buttons shown in Figs. 1 and 2; Fig. 4 is an end view of the detail shown in Fig. 3; Fig. 5 is a detail of my invention; Fig. 6 is an end view of a chain as shown in Fig. 1 equipped with special links; Fig. 7 is a side view of the apparatus shown in Fig. 6; Fig. 8 is a view in perspective of one of the special links illustrated in Figs. 6 and 7; Fig. 9 is a suitable circuit which may be employed in applying my invention to a welding system; Fig. 10 is an auxiliary circuit which may be used to give greater flexibility of operation; Figs. 11 and 12 illustrate certain operating characteristics of the circuit shown in Fig. 9; and Fig. 13 is a special link also shown in the chain of Figs. 6 and 7.

I have provided a master control element such as a contact making and breaking mechanism which may be employed to control a sequence of electrical or mechanical or both electrical and mechanical operations. This control element comprises a suitably driven belt or chain 15, preferably of the endless type, to which suitable operating members 22 are attached. For controlling electric circuits I have provided means on the belt or chain 15 to vary the flow of current within an electric control circuit. In the embodiment of my invention herein described, I provide a chain 15 in which the links of the chain carry extended pins 16 arranged to receive the operating members 22 which may be buttons or blocks, preferably removable, of either insulating or conductive material. A conducting strip or brush 28 is provided to make electrical contact with the buttons as the buttons or members are driven past the brush. It will be apparent that a control circuit including the buttons and the brush will be completed when the brush is in contact with a conducting button. Accordingly, the position of the conducting blocks 22 on the chain determine the timing pattern and the rate at which the buttons pass a fixed reference point will determine the timing of the pattern. Instead of an electrical pick-up including a brush other means to apply a predetermined timing pattern for controlling an electric circuit may be used as, for example, magnetic, electrostatic or photoelectric pick-up arrangements. My invention also includes the attachment of arms or pins to the links of the chain for mechanical engagement with a device to be controlled as, for example, for operating a toggle or counting device.

By employing auxiliary brushes and operating arms 33, my invention may be employed not only to time the occurrence of the predetermined cycle of events but may be used to control any desired auxiliary operations as a counting device, for example, or to start and stop any associated apparatus. Other applications of such a mechanism will readily occur to those skilled in the art.

I have chosen to describe my invention as applied to a welding system. In resistance welding systems of certain types the current is applied intermittently and in such apparatus it is advantageous to be able to simply and quickly change the particular welding cycle to any other cycle without the necessity or inconvenience of gear changing. In such an application, I contemplate the employment of my invention to control the excitation of a circuit adapted to supply current to an electric welder. A suitable supply circuit includes a pair of reversely-connected electric valves 60 (see Fig. 9) and includes means to select the particular half cycle, cycle or group of cycles during which the valves are rendered conductive and also the instant in the chosen half cycle, cycle or group of cycles at which the valve becomes conductive. This means includes in the illustrated embodiment an endless chain 15 which passes over a sprocket 13 driven through a speed-changing device by a synchronous motor 10. If the motor is arranged to drive the chain at a speed such that $2f$ buttons or blocks pass a given stationary point per second, where $f$ is the frequency of the alternating current motor supply, each block or operating member will represent one-half cycle. If control in steps of one cycle is sufficient, the speed may be such that $f$ members pass the reference point per second instead of $2f$ members. In other words, each block or member represents a whole cycle instead of a half cycle.

Any suitable means may be provided on the chain to enable the user to prepare the chain for controlling the above referred to circuit. I prefer to use the above-mentioned commutator and brush arrangement. With this arrangement the particular half cycles during which the valves will be rendered conductive will depend upon the position in the chain of the conducting links. This mechanism will accomplish anything required in modern welding cycles with no gear changes. Any number of complete cycles may be set up since the chain can be almost any length.

I also intend to use special indexing or signal links 32 for such purposes as indexing irregular timing patterns, changing the effective heat for different groups of speeds in any desired sequence, and so on, as will occur to those skilled in the art.

In order to select the particular instant in the desired half cycle at which the valves become conductive, I intend to employ a suitable phase shifting circuit, illustrated herein as exciting a peaking transformer thereby producing peak voltages of variable phase.

In the specific embodiment of my invention herein illustrated, I have provided a synchronous motor 10 supported from the base 11 by means of vibration absorbing pads 12. The motor 10 is arranged to drive a sprocket 13 through a suitable system of gears included within the gear box 14. The gears are selected so that the motor 10 will drive the sprocket 13 at such a speed that the product of the number of sprocket teeth and the speed in revolutions per second of the sprocket is equal to $2f$ where $f$ is the frequency of the supply system in cycles per second assuming that half cycle control is desired. If cycle control is to be employed, the speed in revolutions per second of the sprocket 13 need only be half as great as when half cycle control is employed. In other words, for half cycle control, assuming a 60 cycle supply voltage, 120 blocks should pass the reference point each second while for cycle control only 60 blocks per second will be required to give the necessary control. Sprocket 13 is adapted to drive an endless chain 15 of the roller or bushing type except that the pins 16 connecting the links of the chain are extended as indicated in Fig. 3. The length of the chain is determined by the length of the work cycle, since one link or one commutator button must be provided for each half cycle in the work cycle.

In order to keep the chain 15 taut during operation of the mechanism I provide an idler sprocket 17. I have found that in most cases it is unnecessary to provide any support for the idler sprocket 17 other than the chain 15. However, if an unusually long chain is employed, there may be some whip present or if the floor is not level, the apparatus may be tipped in such a direction that the chain will tend to fly off the driving sprocoket 13. In such cases, I provide a bearing 18 for the sprocket 17, as shown in Fig. 5, which is carried by a bracket 19 adapted to slide on a guide 20 which may be attached at its upper end to base 11. Ordinarily, the weight of the bracket 19 and sprocket 17 is sufficient to keep the chain taut but I have provided clamp 21 so that the bracket 19 may be secured against vertical movement whenever desired. When chains of different lengths are to be interchangeably used, it is advantageous to employ a bracket 19 which is permitted to slide on the guide 20 because of the saving in time which might otherwise be required for loosening and re-tightening clamp 21.

The buttons 22 which are employed in constructing the commutator, as best illustrated in Figs. 3 and 4, are drilled as indicated at 23 to receive the pins 16 and provided on the outside with an annular groove deepened on one side as indicated at 25 for reception of a spring clip 26 which is arranged to engage an annular groove 27 in the pins 16. This arrangement permits ready removal and placement of the buttons or blocks 22 while insuring a firm engagement with the pins. Conducting material, such as iron or brass, is used for the members representing those intervals of time in which it is desired to render the valves conducting while a button or block of insulating material, such as a non-metallic resinous substance, will be applied to the chain corresponding to those portions of the cycle in which it is desired to maintain the valves non-conducting.

I have provided a brush 28 to engage the buttons or blocks 22 of the commutating device. This brush is supported in a brush holder 29. Contact with the external control circuit is made through a clamping screw 30 and a terminal 30a. The holder 29 may be secured to the gear box 14 or in any suitable manner. I have provided means for properly positioning the brush 28 to provide sparkless commutation. This may be done either by adjusting the extent to which the brush 28 projects from the block 29, after first loosening the screw 30, or else by setting brush 28 in a suitable position and turning slightly the sprocket 13 on its shaft. After the best position for sparkless commutation is determined, an indicator 31 is suitably secured to indicate the proper position of the brush. Thereafter as wear of the brush occurs the brush 28 may be moved to the proper position indicated by the indicator 31. Adjustment may also be obtained by turning the sprocket with respect to its shaft.

The steps in setting up the welding cycle will now be briefly described. Assuming that the speed of the apparatus is such that each block represents a half cycle of the supply current, if only conducting blocks are used, current will be supplied to the welder during each half cycle. However, it is more usual to require the intermittent application of current, for example, suppose that it is desired to render the tubes conductive for two half cycles, non-conductive for three half cycles, conductive for two half cycles, non-conductive for three half cycles, and repeat. Two conducting blocks will be snapped into place on successive pins 16. Insulating buttons will be inserted on the three pins next following and so on until the cycle is completed. Since the cycle is to be repeated after the second group of three insulating buttons is applied, the operator will add two conducting buttons, three insulating buttons and so on. When the complete cycle has been set up, the last link is joined to the first link to complete the endless chain. It will be apparent to those skilled in the art that anti-polar or uni-polar starting may be had by arranging the conducting members in a suitable sequence.

The connecting links 105, as shown in Fig. 7 have two pins 16, one at each end, and each link 105 is employed to join roller or bushing links 106 by means of pins 16. If the links 105 are used throughout, an even number of buttons must be used. It may happen, however, that an odd number of members or buttons is desired. For such a case, auxiliary connecting links 107, Figs. 13, 6 and 7, are provided. Auxiliary links 107 are U-shaped and similar to connecting links 106 at one end, but the side pieces 108 are spread out or offest at the opposite end to fit the end of a link 106. A pin 109, similar to pins 16, is run through openings in arms 108 and link 106 to provide one additional block holding pin.

In many instances it may be desirable to control some auxiliary operation. For instance, it may be desirable to change the speed at which the work is advanced to the welding electrode or it may be desired to change the amount of heat during the welding cycle. For any such purpose I have provided special links or cover plates 32 having offset ears or lugs 32a arranged for carrying pins or arms 33 as shown in Fig. 7. It will be understood that special links 32 are interchangeable with the cover plates or links 15a or 15b of the chain 15. It will also be apparent that the chain can be assembled with links 15a and 15b, Fig. 7, as separable parts of the chain to provide the maximum degree of flexibility. These pins 33 are adapted to engage auxiliary brushes 34 which may be suitably connected into an auxiliary circuit as will be described later. While in Fig. 6 I have shown a special link 32 carrying a single pin 33, it will be apparent that any number of pins might be provided for. Furthermore, it is not necessary that pins 33 extend beyond the faces of blocks 22 as shown in Fig. 7. As indicated in Figs. 6 and 7, these auxiliary signals may be carried on either or both sides of the chain. If desired, a special link might be employed having extensions on both sides of the chain. Fig. 7 indicates a suitable brush rigging for these special links. A brush 28 is shown for engagement with the commutator buttons while two auxiliary brushes 34b and 34c are shown below brush 28 to engage auxiliary pins 33b and 33c respectively below the commutator blocks and two similar auxiliary brushes 34 and 34a are arranged above the main brush 28 for engagement with pins 33 and 33a respectively carried outside the commutator blocks 22. In some instances, it may be desirable to have a very slight time delay in the initiation of a certain operation, for example, it may be desired to use a signal to index the welding cycle or, in other words, to provide a contact finger or arm and auxiliary brush to prevent operation of the welder until the proper portion of the cycle is reached and to begin spot welding immediately thereafter, that is, within the first half cycle after reaching the indexing point. This can be accomplished by staggering a pair of pins 33 on one of the special links 32, that is, by placing one of the pins 33 close to the leading edge of the special link while a second pin 33 will be placed near the lagging edge of the special link, each of the pins or arms 33 engaging a suitable auxiliary brush 34. Other uses for auxiliary signals will be readily apparent to those skilled in the art.

A suitable circuit for controlling the operation of the above described application of my invention is shown in Fig. 9. An alternating current supply circuit 50 is connected to the load, a welding circuit 51 in the illustrated embodiment, through a transformer 52 and a pair of reversely-connected electric valves 53 which are connected in series relation with the primary 54 of the welding transformer 52. The electric valves 53 are preferably of the type using an ionizable gas or vapor and include an anode 55, a cathode 56, and a control member 57 which may be of the make alive or immersion ignitor type.

In order to control the energization of the control members 57, I have provided excitation circuits which are associated with the valves 53. The excitation circuits are similar in construction and arrangement and for the remaining description of the circuits I will describe but one of the excitation circuits. It will be understood, however, that the second excitation circuit operates in a similar manner, corresponding parts of each circuit being represented by the same numerals. A control electric valve 60 is provided in each excitation circuit in order to effect the energization of the control member 57 of the valve 53 at the proper times and during predetermined intervals. The control electric valve 60 is preferably of the type employing an ionizable medium and is provided with an anode 61, a cathode 62 and a control member 63 which may be of the grid type. The anode of the control electric valve 60 is connected to the anode of the electric valve 55 through a current limiting resistor 64. The cathode of the control electric valve 60 is connected to the control member 57 of the electric valve 53.

I have provided means for introducing into the excitation circuit a biasing potential tending to maintain the control electric valve non-conducting. For this purpose a transformer 65 provided with a primary 66 and having an intermediate connection 66' connected across the supply lines 50. Transformer 65 is also provided with a pair of secondary windings 67 and a tertiary winding 68. The voltage appearing at the terminals of the secondary winding 67 of the transformer 65 is rectified by means of a half wave rectifier 69 and applied to the excitation circuit across a condenser 70.

In order to introduce into the excitation circuit an applied voltage such as a predetermined number of half cycles of alternating current voltage which tends to render the valve 60 conducting I provide a transformer 71 having a primary 72 and secondaries 73 each of which is connected in series with the bias voltage across each condenser 70. A resistance 73a is connected across each secondary 73 to by-pass any high frequency surges appearing in the grid circuit and also to improve the power factor of transformer 71. In order to energize the primary 72 of transformer 71 I have provided a circuit including the commutator 15 described above and a source of alternating current voltage. This source of voltage is derived from the secondary 68 of the transformer 65. The energization of primary 72 of transformer 71 is intermittent, the sequence and duration of the period being governed by the arrangement of conducting segments on the commutator. A resistor 74 in series with the primary 72 and a capacitor 75 connected in parallel with the primary 72 of transformer 71 are provided in order to smooth out any transients which may have developed in the circuit due to the make and break between brush 28 and the conducting buttons or blocks in the commutator. Lead 74a is shown as grounded. This ground connection is most conveniently made to the motor frame. The magnitude of the alternating current voltage in the excitation circuit occasioned by the voltage obtained from secondary 73 of transformer 71 is insufficient to overcome the negative bias due to the rectified current. Referring to Figs. 11 and 12 the d—c bias applied across condenser 70 is indicated at 76 while the alternating current voltage derived from secondary 73 is indicated by the curve 77. The anode voltage is represented by the curve 78. It is apparent from these curves that the sum of voltages 76 and 77 is at all times insufficient to render the control member 63 of the tube 69 sufficiently positive to render the electric valve 60 conductive.

In order to render the electric valve 60 conductive I provide for the introduction of a second alternating current voltage to cooperate with the first alternating current voltage during predetermined intervals of time established by the voltage obtained from transformer 71. This voltage is obtained from secondary winding 79 of a peaking transformer 80 the primary of which is energized from phase shifting circuit 82. In order to impress an alternating current voltage on primary 81 of transformer 80 of a predetermined phase relationship relative to the voltage of the supply circuit and hence to control the amount of energy transferred to the load, I employ a phase shifting circuit 82 comprising a capacitor 83 and a variable resistor 84. The primary 81 of the transformer 80 is energized through the phase shifting network 82 and the primary 66 of the transformer 65, the circuit including a current limiting resistor 85, reactor 86 and capacitor 87. Reactor 86 and capacitor 87 constitute a tune filter, the purpose of which is to prevent tooth harmonics or any other small distortion of the alternating current wave from affecting the narrow peaks generated in the secondary 79 of transformer 80. The peaks from the peaking transformer 80 appear in the grid circuit of the control electric valve 60 as represented by the numeral 88 in Figs. 11 and 12.

As indicated by Fig. 11 the magnitude of the peak is insufficient to render the control electric valves conducting in the absence of the voltage developed in secondary 73 of transformer 71. However, when transformer 71 is energized, the effective bias on the control member 63 is reduced so that the effective voltage applied to control member 63 of electric valve 60 is sufficient to render the control electric valve 60 conductive.

I have shown an auxiliary control circuit in Fig. 10 which may be used for indexing irregular timing patterns, as for example for changing the effective heat for different groups of spots in any desired sequence or cycling the pressure to the weld. Certain features of this circuit are being disclosed and claimed in my copending patent application, Serial No. 306,997, filed November 30, 1939, which is also a divisional application and which is assigned to the assignee of the present application. The circuit is provided with power, direct current in this exemplification, over a positive main 90 and a negative main 91 for the energization of any desired number of signal elements. I have illustrated three translating devices or signal elements 92, 93 and 94 which may be relays, windings on a saturable reactor, direct current windings for shifting the phase of a peaking transformer or any other desired translating device. In order to control the energization of the translating devices 92, 93 and 94 I have provided excitation circuits including control electric valves 95, 95a and 95b. The control electric valves are preferably of the type employing an ionizable medium and each is provided with an anode 96, a cathode 97 and a control member 98. The cathodes 97 of the electric valves are connected to a tap 100 on the potential divider 99 connected across the d—c supply source 90, 91 in order to maintain the control elements 98 of the electric valves normally negative with respect to the cathodes 97.

In order to vary the bias applied to the control elements 98 for rendering the electric valves 95 conductive, any suitable means may be used. I have shown the use of auxiliary brushes 34, 34a, and 34b adapted to engage signal arms 33, 33a and 33b extending from chain 15 as referred to above although any type switch circuit closing means may be used. These brushes preferably make momentary contact with the respective auxiliary or signal pins to trigger the associated electric valve.

In order that the ignition of one electric valve will extinguish any other electric valve which has been conducting previously, I have provided capacitors 102, 103 and 104.

The condensers are connected between the excitation circuits so that when one of the electric valves fires, as when brush 34 engages pin 33 to fire valve 95, all condensers will be charged. If, at a later time, a second brush as 34a engages its associated pin 33a the grid of the second tube is driven positive, momentarily, with respect to its cathode thereby rendering valve 95a conductive. This action drives anode 96 of valve 95 negative with respect to its cathode 97 by reason of the discharge of condenser 102, thereby extinguishing valve 95.

Thus, assuming that none of the electric valves are conducting but that the chain 15 is running, as soon as brush 34 contacts its pin 33, the control member 98 of the electric valve 95 is grounded. Since positive main 90 is also grounded a positive potential of sufficient magnitude to render valve 95 conducting is applied to control member 98. The consequent flow of current energizes signal element 92 and charges capacitors 102, 103 and 104 as follows. After valve 95 becomes conducting practically the entire voltage drop between tap 100 and the positive lead 90 appears across device 92 since the arc drop in valve 95 is comparatively small. Therefore, the anode 96 of valve 95 will be at a potential different from that of the cathode 97 only by the amount of the arc drop. Condenser 102 may be considered as being connected in a series circuit from the tap 100 of potential divider 99 through valve 95, capacitor 102 and device 93 to the positive lead 90. Thus voltage is applied across capacitor 102 to charge the same. Capacitor 103 is similarly charged through signal member 94 and valve 95, and capacitor 104 is charged through signal element 94, capacitor 102, and valve 95. Assuming that valve 95a fires next, by reason of the engagement of brush 34a and pin 33a that side of capacitor 102 connected to anode 96 of valve 95a is connected to the cathode of valve 95 through the arc within valve 95a. Capacitor 102 tends to discharge through valve 95a and, momentarily, cathode 97 of valve 95 becomes positive with respect to anode 96 of valve 95. Obviously, valve 96 can no longer conduct current and the arc therein is extinguished. Since brush 34 engaged pin 33 only long enough to trigger valve 95, the circuit including brush 34 and pin 33 is now open and valve 95 remains non-conducting until brush 34 again engages pin 33. Thus, the ignition of electric valve 95a commutates out electric valve 95 by driving its anode 96 negative so that only one valve is conducting at any one time. It will be apparent that when valve 95a became conducting device 93 was energized and device 92 was deenergized. In the same manner, signal element or translating device 94 may be energized and signal element 93 deenergized, this process being repeated in any desired order depending upon the signal pin arrangements.

Instead of using a brush having sliding contact with the commutator blocks, I may substitute a small metal disk spaced a short distance away from the faces of the blocks 22, thus providing a small capacitor in which the conducting blocks act as one plate of the condenser and the small metal disk as the other plate. This electrostatic pick-up arrangement amounts to the substitution of a small condenser plate for the brush 28.

A magnetic pick-up is an additional alternative means of control. In this modification permeable and impermeable buttons are used and the control voltage would be obtained from a pick-up coil wound on a magnetic core instead of from the brush and commutator arrangement described. A second winding is arranged on the core and separately excited by suitable means in order to provide the necessary magnetic field. As the buttons carried by the chain pass through the magnetic field, the reluctance of the magnetic circuit will be varied according to whether a permeable or impermeable button is passing, thereby varying the amplitude of the voltage in the pick-up coil which in turn is applied to the excitation circuit of the control electric valve, as described above.

With the electrostatic and magnetic arrangements the insulating blocks may be omitted since in the former modification the capacity of the condenser may be varied by increasing the gap between the chain and pick-up plate as the chain moves past the pick-up plate as well as by inserting an insulating block. From another viewpoint, it is just as practical, or perhaps more so, to insert an aditional air dielectric as it is to provide some other dielectric material during those periods when the control circuit is to be broken. Similarly, with reference to the magnetic system, it is possible to vary the reluctance of the magnetic circuit by increasing the air gap between the chain and pick-up device as well as by inserting an impermeable block in the magnetic circuit. In both cases the air gap may be increased by omitting the insulating or impermeable buttons.

Alternately, instead of providing buttons on the belt or chain, I may use a photoelectric pick-up by providing obstructions on the belt or links of the chain to cut off a light beam for controlling an electric circuit as will be obvious to those skilled in the art.

The insulating segments or blocks also may be omitted when the electric pick-up utilizing the brush structure is used but the resulting "bounce" of the brush against the conducting segments is accompanied by undesirable sparking of the brushes, transients in the electric circuit and rapid brush wear.

It will be apparent that many other modifications of my invention are possible. For example, any sort of belt or tape may be used instead of a chain and any suitable material such as rope, metal, cloth, rubber or paper may be used. Obviously, an endless chain or belt is not necessary although preferred. Moreover, it is within the scope of my invention to provide a chain in which the links themselves are formed of either conductive or insulative material for the conductive pick-up or are formed of various sized links for the electrostatic, magnetic, or light sensitive pick-up. Instead of sprockets for driving the belt or chain, I may use any suitable driving means, as pulleys, for one example.

I also wish to have it understood that where great accuracy of timing is not essential, any belt driving means may be employed and any speed adjusting means may be substituted for the above described arrangement. For example, a variable speed, direct current motor may be used.

While I have described my invention as applied to welding apparatus, it will be apparent that my invention is applicable wherever a flexible timing control is advantageous. For example, my invention may be utilized to control the sequence of flashing electric signs. Another application is to be found in the initiation of a series of operations of electric apparatus, as for instance, to control the life test of an electric relay. My invention may also be used to initiate impulses of electric power supplied to a magnetic shaker. As applied to welding apparatus, my invention may be used to initiate not only the supply of current to the welding circuit but also to start, stop and vary the speed of the work advancing mechanisms at predetermined times or close down the welding apparatus after a prescribed cycle has been completed. For example, a resistance machine may be used to give a preheating cycle, followed by a welding cycle, followed, in turn by an annealing cycle by proper indexing. In such a case signals could be used to index the pattern so that operation will begin with the preheating cycle, to vary the heat for each spot, as by phase control, and to vary the pressure of the electrodes against the work.

While I have shown a particular embodiment of my invention, it will of course be understood that I do not wish to be limited thereto since many modifications may be made both in the circuit arrangement and in the instrumentalities employed, and I therefore contemplate by the appended claims to cover all such modifications as fall within the true spirit and scope of my invention.

What I claim as new and desire to secure by Letters Patent of the United States, is:

1. In a power circuit having means to supply energy to a work circuit including a pair of reversely connected electric valves for controlling the flow of power to said work circuit and each having a control member for controlling the conductivity thereof, an excitation circuit for the control members comprising a source of current and a commutating device having relatively movable contacts for connecting said source to said control members, and means to suppress transients occasioned by said commutating device including a resistance and a capacitance connected in series relation with each other and in series relation with said source.

2. Timing apparatus comprising a belt, means for driving said belt, a plurality of members of electrically conducting material carried by said belt, a brush arranged to engage said members for completing an electric circuit through said members, a source of exciting current connected in said circuit, and means to suppress transients developed in said circuit due to the making and breaking of the contact between said members and said brush including a resistance in series with said source and a capacitance in parallel with said source.

3. In combination, an alternating current supply circuit, a load circuit, means comprising a pair of reversely connected electric valve means connected between said supply circuit and said load circuit for transmitting power therebetween, said electric valve means having a control member for controlling the conductivity thereof, a transformer having a primary winding connected to said supply circuit and having a pair of secondary windings and a tertiary winding, means energized from said pair of secondary windings for impressing on said control members biasing potentials tending to maintain said electric valve means non-conductive, means energized from said tertiary winding comprising a contact making and breaking mechanism for impressing on said control members alternating voltages tending to render said electric valve means conductive but of insufficient magnitude to overcome the effect of said biasing potentials, and means comprising a peaking transformer energized from said alternating current circuit for superimposing on said biasing potentials and said alternating voltages periodic voltages of peaked wave form to cooperate with said alternating voltages to render said electric valve means conductive during predetermined intervals of time established by said mechanism.

4. In combination, an alternating current supply circuit, a load circuit, means comprising a pair of reversely connected electric valve means connected between said supply circuit and said load circuit for transmitting power therebetween, each of said electric valve means having a control member for controlling the conductivity thereof, a transformer having a primary winding connected to said supply circuit and having a pair of secondary windings and a tertiary winding, means energized from said pair of secondary windings for impressing on said control members unidirectional biasing potentials tending to maintain said electric valve means non-conductive, means energized from said tertiary winding comprising a contact making and breaking mechanism for impressing on said control members alternating voltages tending to render said electric valve means conductive but of insufficient magnitude to overcome the effect of said unidirectional biasing potentials, means comprising a peaking transformer energized from said alternating current circuit for superimposing on said biasing potentials and said alternating voltages periodic voltages of peaked wave form to cooperate with said alternating voltages to render said electric valve means conductive during predetermined intervals of time established by said mechanism, and filtering means connected between said supply circuit and said peaking transformer to absorb transient voltages occasioned by the operation of said contact making and breaking mechanism to prevent undesired variations in the phase of said peaked voltages relative to the voltage of said alternating current circuit.

5. In combinaiton, an alternating current supply circuit, a load circuit, electric translating apparatus connected between said circuits and comprising a pair of reversely connected electric valve means for transmitting power therebetween and each comprising a control member for controlling the conductivity thereof, a transformer having a primary winding connected to said supply circuit and having a pair of secondary windings and a tertiary winding, said primary winding having an intermediate connection, means energized from said pair of secondary windings for impressing on said control windings biasing potentials tending to maintain said electric valve means non-conductive, means comprising contact making and breaking mechanism energized from said tertiary winding for impressing on said control members a predetermined number of half cycles of voltage tending to render said electric valve means conductive but being of insufficient magnitude to actually render the electric valve means conductive, a peaking transformer having a primary winding connected between said supply circuit and said intermediate connection of the first mentioned transformer and having a pair of secondary windings for impressing on said control members periodic voltages of peaked wave form sufficient in magnitude when cooperating with said alternating voltages to render said electric valve means conductive during the number of half cycles established by said mechanism, and filtering means connected in series relation with the primary winding of said peaking transformer comprising a resonant circuit tuned substantially to the frequency of the making and breaking operations of said mechanism to absorb transient voltages occasioned thereby and to prevent undesired shift in phase of the periodic voltages of peaked wave form.

6. In combination, an alternating current supply circuit, a load circuit, electric translating apparatus connected between said circuits for supplying power to said load circuit and comprising electric valve means having a control member, and a circuit for energizing said control member to render said electric valve means conducting for a predetermined number of half cycles of voltage of said supply circuit comprising a transformer for producing a periodic voltage of peaked wave form and means including a source of alternating voltage and a contact making and breaking mechanism for connecting said source to said control member thereby effecting energization of said load circuit for a period of time corresponding to said number of half cycles.

7. In combination, an alternating current supply circuit, a load circuit, electric translating apparatus connected between said circuits for transmitting power therebetween and including an electric valve means having a control member, means for impressing on said control member a biasing potential tending to maintain said electric valve means non-conducting, means comprising a peaking transformer energized from said alternating current circuit for impressing on said control member a periodic voltage of peaked wave form the magnitude of which is insufficient in itself to overcome the effect of said biasing potential, means energized from said alternating current circuit for producing an alternating voltage which cooperating with said periodic voltage of peaked wave form is sufficient to overcome the effect of said biasing potential to render said electric valve means conducting for a predetermined number of half cycles of voltage of said supply circuit and comprising a contact making and breaking mechanism, and means connected to said mechanism for absorbing the transient voltages occasioned by the operation of said contact making and breaking mechanism.

8. In combination, an alternating current supply circuit, a load circuit, electric translating apparatus connected between said circuits for transmitting power therebetween and including an electric valve means having a control member, means for impressing on said control member a biasing potential tending to maintain said electric valve means nonconducting, means comprising a peaking transformer energized from said alternating current circuit for impressing on said control member a periodic voltage of peaked wave form the magnitude of which is insufficient in itself to overcome the effect of said biasing potential, means energized from said alternating current circuit for producing an alternating voltage which cooperating with said periodic voltage of peaked wave form is sufficient to overcome the effect of said biasing potential to render said electric valve means conducting for a predetermined number of half cycles of voltage of said supply circuit and comprising a contact making and breaking mechanism, and filtering means connected between said supply circuit and said peaking transformer to prevent undesired variations in phase of said periodic voltage relative to the voltage of said alternating current circuit.

9. In combination, an alternating current supply circuit, a load circuit, electric translating apparatus connected between said circuits for transmitting power therebetween and including an electric valve means having a control member, means for impressing on said control member a biasing potential tending to maintain said electric valve means nonconducting, means comprising a peaking transformer energized from said alternating current circuit for impressing on said control member a periodic voltage of peaked wave form the magnitude of which is insufficient in itself to overcome the effect of said biasing potential, means energized from said alternating current circuit for producing an alternating voltage which cooperating with said periodic voltage of peaked wave form is sufficient to overcome the effect of said biasing potential to render said electric valve means conducting for a predetermined interval corresponding to a number of half cycles of voltage of said supply circuit and comprising a contact making and breaking mechanism for impressing on the control member a predetermined number of half cycles of voltage of said supply circuit, filtering means connected between said supply circuit and said peaking transformer to prevent undesired variations in phase of said periodic voltage relative to the voltage of said alternating current circuit, and means for adjusting the phase of said periodic voltage of peaked wave form to control the value of current transmitted to said load circuit during the intervals established by said mechanism.

LOUIS G. LEVOY, Jr.